(12) United States Patent
Le et al.

(10) Patent No.: US 7,504,035 B2
(45) Date of Patent: Mar. 17, 2009

(54) TREATMENT OF PUTRESCRIBLE CAKES

(75) Inventors: Son Le, Warrington (GB); Duc Do, Shatin, N.T. (HK)

(73) Assignee: United Utilities PLC, Cheshire (GB)

( * ) Notice: Subject to any disclaimer, the term of this patent is extended or adjusted under 35 U.S.C. 154(b) by 232 days.

(21) Appl. No.: 11/536,320

(22) Filed: Sep. 28, 2006

(65) Prior Publication Data

US 2007/0128712 A1 Jun. 7, 2007

(30) Foreign Application Priority Data

Sep. 29, 2005 (GB) .................................. 0519833.8

(51) Int. Cl.
*C02F 11/02* (2006.01)
*C02F 3/28* (2006.01)
*C05F 7/00* (2006.01)

(52) U.S. Cl. ........................ 210/601; 210/631; 210/916; 435/262.5; 71/12

(58) Field of Classification Search ................. 210/601, 210/603, 631, 916; 435/262, 262.5; 71/8, 71/12
See application file for complete search history.

(56) References Cited

U.S. PATENT DOCUMENTS

| | | | | |
|---|---|---|---|---|
| 1,633,078 A | * | 6/1927 | Engle | .................... 504/102 |
| 1,997,252 A | * | 4/1935 | Fischer | ........................ 210/631 |
| 5,972,220 A | * | 10/1999 | Bailey | .................... 210/605 |
| 2001/0011646 A1 | * | 8/2001 | Moore, Jr. | ..................... 210/724 |
| 2002/0088749 A1 | | 7/2002 | Highsmith | |
| 2004/0226891 A1 | * | 11/2004 | Dentel | ......................... 210/722 |
| 2005/0115895 A1 | | 6/2005 | Simpson et al. | |
| 2005/0142096 A1 | | 6/2005 | Wegner | |

FOREIGN PATENT DOCUMENTS

| | | | |
|---|---|---|---|
| DE | 19505873 | * | 8/1996 |
| EP | 0143392 | | 6/1985 |
| FR | 2837814 | | 10/2003 |
| GB | 2410495 | | 8/2005 |
| HU | 38887 | | 7/1986 |
| JP | 54092684 | | 7/1979 |
| JP | 2001151585 | | 6/2001 |
| WO | 93/14046 | | 7/1993 |
| WO | 03/086986 | | 10/2003 |

OTHER PUBLICATIONS

United Kingdom Search of GB0413190.9, prepared Dec. 16, 2004 and GB0519833.8, prepared Jan. 10, 2006.

* cited by examiner

*Primary Examiner*—Fred Prince
(74) *Attorney, Agent, or Firm*—Michael Best & Friedrich LLP

(57) ABSTRACT

A method of treating putrescible cakes to reduce the *E. Coli* and odor present in the cake and prevent further odor generation comprising the step of maintaining the cake under substantially anoxic condition in the presence of ammonium and/or nitrate moieties at pH 7.5 to pH 10.5 for a period of more than 1 day, the cake having a solids content of between 20% to 75% by weight.

39 Claims, No Drawings

TREATMENT OF PUTRESCRIBLE CAKES

FIELD OF THE INVENTION

This application relates to a method for the reduction of odour and *E. coli* in putrescible cakes. In particular, it relates to a method for the treatment of a sewage sludge cake containing at least 20% solids.

BACKGROUND OF THE INVENTION

Biodegradable organic wastes are produced in large quantities annually by industrial, agricultural and domestic activities. In the treatment of municipal sewage, for instance, at least three such waste streams are produced, namely grits, screenings, and sewage sludge. All biodegradable materials are capable of undergoing putrefaction, however, the process only occurs in the presence of at least 10% water. Normally, significant putrefaction can be observed when such a waste contains over 20% water. It is known that in the process of putrefaction many volatile components such as hydrogen sulphide, mercaptans, volatile fatty acids and ammonia are generated. Such compounds are responsible for the offensive odour that is characteristic of rotting matters. In industrialised countries such organic wastes are disposed off in incinerators, landfills or recycled to agriculture as fertiliser or soil conditioner. However, incineration and land filling are regarded as needless destruction of valuable resources and environmentally harmful. Thus, in Europe for instance, recycling is encouraged while both incineration and land filling are being restricted.

There are regulations governing the recycling of any waste products to agriculture. They vary from country to country, but an important underlying principle of recycling is that it should bring an agricultural benefit and have regards for environment health and odour nuisance. Agricultural benefit will be achieved when an application of a waste to land improves soil conditions for crop growth whilst ensuring the protection of the environment. If the wastes contain pathogens, as is the case with sewage sludge, health risks may exist for farm workers and animals. Suitable treatment processes must therefore be applied to the wastes before recycling. Such treatments must be capable of significantly reducing the *E. coli* content of the waste and preventing odour generation by imparting stability to the material.

Known treatments for organic wastes include biological, physical and chemical processes. Biological processes such as anaerobic digestion or composting impart stability to the waste by reducing its organic content. Thermal drying is a physical treatment that does not alter the chemical make up of the waste and stabilisation can only be achieved by reducing and maintaining the water content of the waste to a level below 10%. Lime is the most common chemical treatment for sewage sludge. In this case, the organic content of the sludge remains unchanged. The lime typically raises the pH of sludge to over pH 12 whereby pathogens such as *E. coli* are deactivated.

The mentioned treatment processes all have disadvantages and drawbacks. Digestion and composting, for instance, are very slow processes. Typically, they take several weeks to complete and require very costly processing plants. On the other hand, drying is very energy intensive and sludge drying, in particular, is often a hazardous process because of the risk of explosion with the ever presence of dust. Lime treatment is only favourable for applications on acid soils. On exposure to air, particularly during a long stockpiling period, reaction between the lime and carbon dioxide rapidly reduces the pH of sludge to a level where biological activities can resume and the resulting odour release may cause a nuisance.

There have also been attempts to convert organic wastes to fertilisers. Such methods combine chemical treatment at elevated temperature to kill pathogen and odour causing bacteria and simultaneously achieve nutrient enhancement. EP 0143392 A1 (ECODECO spa) describes a salting process for sludge slurry having dry solid content of 0.1% to 20% by weights. The process uses high salt concentration, for example, saturated ammonium sulphate with acidic pH. WO 93/14046 A1 (KAMBI AS) describes a very high temperature acid treatment to dissolve the solids followed by neutralization of the resulting hydrolysate with ammonia. In yet another application (US 2002/0088749 A1) Highsmith describe a treatment method involving ammonium and phosphate salts with acids. The Highsmith method applies to anaerobically digested sludge rather than raw sludge and it does not address the odour issue in any satisfactory manner. While the increased nutrient value of such organic fertilisers make them valuable, the high cost of their manufacture has not facilitated their commercialisation.

SUMMARY OF THE INVENTION

It is an object of the present invention to obviate or mitigate the above disadvantages and drawbacks.

According to a first aspect the present invention there is provided a method of treating putrescible cakes to reduce the *E. coli* and odour present in the waste and prevent further odour generation therefrom, the method comprising the step of maintaining the cake under substantially anoxic condition in the presence of a nitrate moiety, the cake having a solids content of at least 20% by weight.

DETAILED DESCRIPTION OF THE INVENTION

It is to be understood that a cake is a material containing both solid matters and water. Preferably, the cake has a solids content of between 20% to 75% by weight. The solid matters are in the form of very fine particles. Cakes suitable for treatment by the process of the present invention would typically be the product from a dewatering process such as a filter press or a centrifuge and may have undergone a size reduction process such as maceration or milling. Digested sludge cake and some composted materials can often be very odorous and may thus benefit from further treatment by a method of the present invention.

Anoxic condition occurs at very low levels of free oxygen or in the absence of free oxygen. Under such condition certain facultative anaerobes are capable of breaking down oxygen-containing compounds such as nitrates to obtain the oxygen required for their metabolism. Nitrate compounds are often added to sewage to prevent septicity development in sewer. Very low concentrations of nitrate are used in sewage treatment, typically less than 50-ppm nitrate. Such concentrations are not effective for putrescible cakes.

Any nitrate compound can be used conveniently in the present invention. Suitable nitrate compounds include any nitrates of iron, calcium, magnesium, sodium, potassium and ammonia. Preferred nitrate compounds include: nitrates of calcium, potassium and ammonia. Ammonium nitrate is most preferred. In order to maintain a sufficient level of nitrate in the cake during the treatment period, nitrate amount of 0.25% to 10% by weight should be admixed to the cake initially. Preferably the amount of material added to the cake is 0.5% to 5% by weight as nitrate.

It is preferable for the treatment of the cake to occur at a pH of at least 7.0, more preferably pH7.5 to 10.5. The cake is preferably treated according to the first aspect of the invention for a period of at least one day. In a preferred embodiment of the present invention, the cake is treated under substantially anoxic condition in the presence of both ammonium and nitrate moieties. To this end, a second aspect the present invention there is provided a method of treating putrescible cakes to reduce the *E. coli* and odour present in the waste and prevent further odour generation therefrom, the method comprising the step of maintaining the cake under substantially anoxic condition in the presence of both ammonium and nitrate moieties the cake having a solids content of at least 20% by weight.

Animal wastes almost always contain ammonia and have extremely high level of *E. coli*, which would suggest that either such pathogens are resistant to ammonia attack or that the ammonia found in the wastes is not of sufficient concentration or not present in the correct chemical form. Indeed, the ECODECO process referred to above teaches the use of very high concentration of ammonium sulphate at acid pH for effective pathogen destruction. It is therefore surprising to discover that when low concentration of urea is added to organic waste such as sewage sludge cake, particularly a cake that has become septic, that the pathogens in the cake quickly become deactivated and its offensive odour is also reduced. Similar effects are also observed with low concentration of ammonium salts at elevated pH. Furthermore, the odour neutralization rate increases substantially in the presence of nitrate.

Any ammonium compound can be used conveniently in the present invention. Suitable ammonium compounds include: urea and ammonium salts of any mineral acids. Preferred ammonium compounds include ammonium salts of carbonate, nitrate, sulphate and urea. A good source of ammonium carbonate is digested sludge. Urea is most preferred source of ammonia. Ammonium level of 0.25% to 10% by weight produces good pathogen destruction rate. Preferably the amount of material added to the cake is 0.5% to 5% by weight as ammonia.

The initial pH of many putrescible cakes is normally found to be in the range pH5.5 to pH7.5. During the treatment period of the process of the present invention the pH rises naturally as a result of the break down of urea and nitrate. However, in order to increase the rate of pathogen destruction the pH may be raised by the addition of a hydroxide. Suitable hydroxide includes the oxides or hydroxides of potassium, magnesium and calcium.

Cake that has been treated by method of the present invention may be paste-like and proves difficult to apply to the soil using conventional spreaders. It may therefore be desirable to reduce the moisture content of the treated cake to make it friable. This could be achieved by incorporating a dry bulking agent into the paste or by evaporation of its moisture. Any powdered materials are suitable as a bulking agent although the use of at least one of the following is particularly advantageous: gypsum, limestone, calcined magnesite, dry sludge, woodchips, etc.

Specific embodiments of the present invention will now be described by way of examples as follows:—

EXAMPLE 1

Samples of raw sewage sludge cake with mean solids content of 25.6% were treated with various amounts of urea. The *E. coli* content (cfu/g dry weight) of the samples was monitored over a period. The results of the treatments are shown in table 1 below.

TABLE 1

*E. coli* reduction with urea treatment for raw sewage sludge (25.6% DS)

| Days | Untreated | 0.5% dose | 1.0% dose | 1.5% dose |
|---|---|---|---|---|
| 0  | 3.46E+06 | 1.36E+06 | 1.39E+06 | 1.23E+06 |
| 1  | 9.81E+05 | 7.58E+06 | 6.15E+06 | 1.30E+03 |
| 8  | 6.04E+05 | 1.32E+05 | 3.25E+03 | 9.03E+02 |
| 14 | 6.26E+05 | 1.18E+05 | 9.58E+02 | 2.09E+02 |
| 22 | 4.97E+05 | 4.55E+04 | 3.35E+02 | 1.00E+01 |

EXAMPLE 2

Samples of digested sludge cake with mean solids content of 24.8% were treated with various amounts of urea. The *E. coli* content (cfu/g dry weight) of the samples was monitored over a period. The results of the treatments are shown in table 2 below.

TABLE 2

*E. coli* reduction with urea treatment for digested sewage sludge (24.8% D

| Days | Untreated | 0.5% dose | 1.0% dose | 1.5% dose |
|---|---|---|---|---|
| 0  | 1.24E+04 | 4.67E+04 | 1.79E+04 | 1.19E+04 |
| 1  | 5.66E+03 | 1.86E+03 | 6.97E+03 | 4.57E+03 |
| 4  | 5.42E+03 | 1.21E+02 | 7.90E+01 | 3.70E+01 |
| 7  | 8.79E+03 | 1.94E+02 | 7.90E+01 | 1.54E+02 |
| 14 | 4.61E+03 | 3.90E+01 | 1.34E+02 | 7.90E+01 |
| 50 | 9.86E+03 | 5.40E+01 | 1.85E+02 | 4.10E+01 |

EXAMPLE 3

A sample of raw sewage sludge cake with mean solids content of 24.81% was treated with 1.5% ammonium nitrate (weight by weight basis). The *E. coli* content (cfu/g dry weight) of the sample, its pH and odour characteristics were monitored over a period. The results of the treatments are shown in table 3 below.

TABLE 3

Treatment results for raw sludge cake with 1.5% ammonium nitrate

| Days | PH | *E. coli* | Odour characteristics |
|---|---|---|---|
| 0  | 5.9 | 1.41E+06 | Strong offensive odour |
| 1  | 6.1 | 3.21E+05 | Less offensive odour |
| 8  | 6.2 | 6.77E+03 | Inoffensive, earthly odour |
| 22 | 6.9 | 5.12E+03 | Inoffensive, earthly odour |

EXAMPLE 4

A sample of milled sewage screenings with mean solids content of 54.1% was treated with 3% ammonium nitrate (weight by weight basis). The treated sample was kept in a large skip for 1 week. After the described treatment the material was found to have an inoffensive, earthly odour. The *E. coli* content of the sample was reduced by a factor of 275.

EXAMPLE 5

A sample of raw sewage sludge cake with pH5.5 and 24.1% solid content of was admixed with 3% calcium nitrate and 1% urea (weight by weight basis). The treated sample was stockpiled in the open air for 3 weeks. After the described treatment the material was found with pH8.2 and an inoffensive, earthly odour. The *E. coli* content of the sample was reduced by a factor of over 10,000 by the treatment.

EXAMPLE 6

A sample of raw sewage sludge cake with pH5.5 and 24.1% solid content of was admixed with 5% of a blend of calcium nitrate, ammonium sulphate and magnesium oxide (2:1:1 by weight). The treated sample was stockpiled in the open air for 3 weeks. After the described treatment the material was found with pH8.1 and an inoffensive, earthly odour. The *E. coli* content of the sample was reduced by a factor of over 10,000 by the treatment.

EXAMPLE 7

A sample of raw sewage sludge cake with pH5.8 and 24.6% solid content of was admixed with 0.5% calcium nitrate and 1% urea (weight by weight basis). The treated sample was stored in a process vessel for 24 hours. After the described treatment the cake was further treated by evaporation and pelletization. The pelletized product (3-5 mm in size) was low in odour and *E. coli* content and was found to have 84.1% solid content.

We claim:

1. A method of treating putrescible cakes to reduce the *E. coli* and odour present in the cake and prevent further odour generation therefrom, the method comprising the step of maintaining the cake under substantially anoxic condition in the presence of a nitrate moiety, the cake having a solids content of at least 20% by weight.

2. A method according to claim 1 wherein the cake has a solids content of between 20% to 75% by weight.

3. A method according to claim 1, wherein the nitrate moiety is provided by at least one of any nitrates of iron, calcium, magnesium, sodium, potassium and ammonia.

4. A method according to claim 1 wherein the nitrate compound is a nitrate of calcium, potassium or ammonia.

5. A method according to claim 4 wherein the nitrate is calcium nitrate.

6. A method according to claim 4 wherein the nitrate is provided by ammonium nitrate.

7. A method according to claim 1 further comprising treating the cake under substantially anoxic condition in the presence of an ammonium moiety in addition to the nitrate moiety.

8. A method according to claim 1, wherein the level of nitrate in the cake during the treatment period is 0.25% to 10% by weight initially.

9. A method according to claim 8, wherein the amount of material added to the cake is 0.5% to 5% by weight as nitrate.

10. A method according to claim 1 wherein treatment of the cake occurs at a pH of at least 7.0.

11. A method according to claim 10 wherein treatment occurs at pH 7.8 to pH 9.5.

12. A method according to claim 10 wherein treatment occurs at pH 8.0 to pH 9.0.

13. A method according to claim 1 wherein the treatment is carried out for a period of at least one day.

14. A method according to claim 13 wherein the treatment is carried out for a period of 1 to 365 days.

15. A method according to claim 13 wherein the treatment is carried out for a period of 5 to 180 days.

16. A method according to claim 1, wherein the cake is a waste material derived from sewage treatment or from food processing or a fermentation process.

17. A method according to claim 1, wherein the cake is an animal by product.

18. A method according to claim 1, wherein the pH of the cake is adjusted with a hydroxide that includes the oxides or hydroxides of potassium, magnesium and calcium.

19. A method according to claim 1, wherein the moisture content of the treated cake is further reduced by incorporating a dry bulking agent into the cake or by evaporation of its moisture.

20. A method of treating putrescible cakes to reduce the *E. coli* and odour present in the cake and prevent further odour generation therefrom, the method comprising the step of maintaining the cake under substantially anoxic condition in the presence of both ammonium and nitrate moieties, the cake having a solids content of at least 20% by weight.

21. A method according to claim 20, wherein the nitrate moiety is provided by at least one of any nitrates of iron, calcium, magnesium, sodium, potassium and ammonia.

22. A method according to claim 21 wherein the nitrate is provided by calcium nitrate.

23. A method according to claim 20, wherein the level of nitrate in the cake during the treatment period is 0.25% to 10% by weight initially.

24. A method according to claim 23 wherein the amount of material added to the cake is 0.5% to 5% by weight as nitrate.

25. A method according to claim 20, wherein the ammonium moiety is provided by at least one compound selected from the group consisting of: urea and ammonium salts of any mineral acids.

26. A method according to claim 25 wherein the ammonium compounds include ammonium salts of carbonate, nitrate, sulphate and urea.

27. A method according to claim 25 wherein urea provides the ammonium moiety.

28. A method according to claim 20, wherein ammonium level is 0.25% to 10% by weight.

29. A method according to claim 28 wherein the level is 0.5% to 5% by weight as ammonia.

30. A method according to claim 20 wherein treatment of the cake occurs at a pH of at least 7.0.

31. A method according to claim 30 wherein treatment occurs at pH 7.8 to pH 9.5.

32. A method according to claim 30 wherein treatment occurs at pH 8.0 to pH 9.0.

33. A method according to claim 30 wherein the treatment is carried out for a period of at least one day.

34. A method according to claim 33 wherein the treatment is carried out for a period of 1 to 365 days.

35. A method according to claim 33 wherein the treatment is carried out for a period of 5 to 180 days.

36. A method according to claim 20, wherein the cake is a waste material derived from sewage treatment or from food processing or a fermentation process.

37. A method according to claim 20, wherein the cake is an animal by product.

38. A method according to claim 20, wherein the pH of the cake is adjusted with a hydroxide that includes the oxides or hydroxides of potassium, magnesium and calcium.

39. A method according to claim 20, wherein the moisture content of the treated cake is further reduced by incorporating a dry bulking agent into the cake or by evaporation of its moisture.

* * * * *